US012712365B2

(12) United States Patent
Cai et al.

(10) Patent No.: US 12,712,365 B2
(45) Date of Patent: Aug. 18, 2026

(54) POWER GRID CONFIGURATION CONTROL METHOD AND APPARATUS FOR FLEXIBLE DIRECT CURRENT POWER TRANSMISSION SYSTEM, AND MEDIUM

(71) Applicant: ELECTRIC POWER RESEARCH INSTITUTE. CHINA SOUTHERN POWER GRID, Guangzhou (CN)

(72) Inventors: Dongxiao Cai, Guangzhou (CN); Weihuang Huang, Guangzhou (CN); Yijing Chen, Guangzhou (CN); Yan Li, Guangzhou (CN); Xiaobin Zhao, Guangzhou (CN); Shukai Xu, Guangzhou (CN)

(73) Assignee: ELECTRIC POWER RESEARCH INSTITUTE. CHINA SOUTHERN POWER GRID, Guangzhou (CN)

( * ) Notice: Subject to any disclaimer, the term of this patent is extended or adjusted under 35 U.S.C. 154(b) by 390 days.

(21) Appl. No.: 18/555,265

(22) PCT Filed: Nov. 19, 2021

(86) PCT No.: PCT/CN2021/131703
§ 371 (c)(1),
(2) Date: Oct. 13, 2023

(87) PCT Pub. No.: WO2022/217918
PCT Pub. Date: Oct. 20, 2022

(65) Prior Publication Data

US 2024/0195177 A1 Jun. 13, 2024

(30) Foreign Application Priority Data

Apr. 14, 2021 (CN) ......................... 202110399461.0

(51) Int. Cl.
*H02J 3/16* (2026.01)
*H02J 103/30* (2026.01)
*H02J 103/35* (2026.01)

(52) U.S. Cl.
CPC ............. *H02J 3/16* (2013.01); *H02J 2103/30* (2026.01); *H02J 2103/35* (2026.01)

(58) Field of Classification Search
CPC ........ H02J 3/36; H02J 3/48; H02J 3/16; H02J 3/50; H02J 3/24; H02J 3/241; H02J 3/12;
(Continued)

(56) References Cited

U.S. PATENT DOCUMENTS

2018/0034276 A1* 2/2018 Schultz ..................... H02J 3/40
2018/0145582 A1 5/2018 Shuai et al.

FOREIGN PATENT DOCUMENTS

CN 106998074 A 8/2017
CN 108879726 A 11/2018
(Continued)

OTHER PUBLICATIONS

CN 109088439 A NPL Translation (Year: 2018).*
(Continued)

*Primary Examiner* — Bryan R Perez
(74) *Attorney, Agent, or Firm* — Yue (Robert) Xu; Apex Attorneys at Law, LLP

(57) ABSTRACT

A method and a device for controlling grid configuration of a flexible direct current electric power transmission system, and a computer-readable storage medium are provided. The active power reference value is modified based on the frequency deviation of the alternating current grid. The reactive power reference value is modified based on the voltage deviation of the alternating current grid. The outputted active power and the outputted reactive power are controlled based on the active power reference value and the
(Continued)

reactive power reference value, respectively. The grid voltage is further configured and controlled through power control, so that the system is capable of self-synchronization, frequency regulation and voltage regulation. In addition, the virtual synchronous machine technology is introduced into control of the reactive power, so that the system can provide inertia support for the grid voltage amplitude.

9 Claims, 4 Drawing Sheets

(58) Field of Classification Search
CPC .... H02J 3/18; H02J 3/381; H02J 3/001; H02J 3/28; H02J 3/32; H02J 3/40; H02J 2203/20; H02J 2203/10; H02J 2003/365
See application file for complete search history.

(56) References Cited

FOREIGN PATENT DOCUMENTS

| | | | | |
|---|---|---|---|---|
| CN | 109088439 A | * 12/2018 | ................ | H02J 3/40 |
| CN | 110571871 A | 12/2019 | | |
| CN | 111525595 A | 8/2020 | | |
| CN | 112086991 A | 12/2020 | | |
| CN | 112600232 A | 4/2021 | | |
| CN | 113113929 A | 7/2021 | | |
| WO | 2017190291 A1 | 11/2017 | | |
| WO | 2019161906 A1 | 8/2019 | | |

OTHER PUBLICATIONS

International Search Report for PCT/CN2021/131703 mailed Feb. 16, 2022, ISA/CN.

CNIPA First Office Action corresponding to Application No. 202110399461.0; Issued date of Apr. 2, 2022.

Zhang Ke, A Thesis Submitted in Partial of Fulfillment of the Requirements for the Degree of Master of Engineering, Engineering Technology ISSN 1671-5519 Jul. 31, 2018.

Zhao Xiongguang, Control of multi-terminal VSC-HVDC system based on V-I characteristics, Advanced Technology of Electrical Engineering and Energy, Oct. 31, 2013.

Javier Rened etc., Coordinated Design of Supplementary Controllers in VSC-HVDC Multi-Terminal Systems Ito Electromechanical Oscillations, IEEE Transactions ONI20210131 Power Systems.

Cao Fengmei etc., Proportional Integral-Quasi-Resonant-Repetitive Control Strategy for VSC of VSC-HVDC, Power System Technology, Apr. 30, 2015.

European Search Report issued on Apr. 7, 2025 for the European counterpart application No. 21936784.4.

* cited by examiner

POWER GRID CONFIGURATION CONTROL METHOD AND APPARATUS FOR FLEXIBLE DIRECT CURRENT POWER TRANSMISSION SYSTEM, AND MEDIUM

The present application is a national phase application of PCT international patent application PCT/CN2021/131703, filed on Nov. 19, 2021 which claims priority to Chinese Patent Application No. 202110399461.0, titled "POWER GRID CONFIGURATION CONTROL METHOD AND APPARATUS FOR FLEXIBLE DIRECT CURRENT POWER TRANSMISSION SYSTEM, AND MEDIUM", filed on Apr. 14, 2021 with the China National Intellectual Property Administration, both of which are incorporated herein by reference in their entireties.

FIELD

The present disclosure relates to the technical field of direct current electric power transmission, and in particular to a method and a device for controlling grid configuration of a flexible direct current electric power transmission system, as well as a computer-readable storage medium.

BACKGROUND

As a new generation of direct current electric power transmission technology, flexible direct current electric power transmission systems have advantages of no commutation failure, the ability to supply power to passive systems, low harmonic, and small footprint, and therefore are widely used in the fields of long-distance electric power transmission, asynchronous grid-connection, offshore wind farm access to the power grid, and distributed energy grid-connection.

Typical control solutions for the flexible direct current electric power transmission systems are mainly divided into two categories, one is amplitude-phase control, and the other is double-closed-loop vector control, both involve a phase-locked loop to track the grid voltage phase for coordinate transformation. The phase-locked loop may fail to operate stably when the alternating current grid is weak. When a frequency or voltage of the alternating current grid deviates, the flexible direct current electric power transmission system under such control is incapable of self-synchronization, frequency regulation and voltage regulation, and fails to provide inertia support for an amplitude and a frequency of the grid voltage.

SUMMARY

A method and a device for controlling grid configuration of a flexible direct current electric power transmission system, as well as a computer-readable storage medium are provided according to various aspects of embodiments of the present disclosure, to solve the problem that the existing method for controlling the grid configuration of the flexible direct current electric power transmission system fails to provide inertia support for the amplitude and the frequency of the grid voltage while configuring and controlling the grid voltage.

The method for controlling the grid configuration of the flexible direct current electric power transmission system according to embodiments of the present disclosure includes: modifying an active power reference value based on a frequency deviation of an alternating current grid; modifying a reactive power reference value based on a voltage deviation of the alternating current grid; controlling an outputted active power by using a pre-established frequency regulation motion equation of a virtual synchronous machine based on the active power reference value and configuring a phase angle; controlling an outputted reactive power by using a pre-established voltage regulation motion equation of the virtual synchronous machine based on the reactive power reference value and configuring a grid voltage amplitude; and performing PI control on an actual grid voltage based on the grid voltage amplitude and the phase angle and acquiring a three-phase voltage reference value through inner-loop control.

Preferably, the modifying the active power reference value based on the frequency deviation of the alternating current grid includes: determining an active power setting value as the active power reference value when it is detected that the frequency deviation of the alternating current grid is less than a preset frequency deviation threshold; and adding a deviation value of active power that changes with a frequency of the alternating current grid to the active power setting value and determining the obtained sum as the active power reference value when it is detected that the frequency deviation of the alternating current grid is greater than the preset frequency deviation threshold.

Preferably, the modifying the reactive power reference value based on the voltage deviation of the alternating current grid includes: determining a reactive power setting value as the reactive power reference value when it is detected that the voltage deviation of the alternating current grid is less than a preset voltage deviation threshold; and adding a deviation value of reactive power that changes with a voltage of the alternating current grid to the reactive power setting value and determining the obtained sum as the reactive power reference value when it is detected that the voltage deviation of the alternating current grid is greater than the preset voltage deviation threshold.

Preferably, the frequency regulation motion equation of the virtual synchronous machine is expressed as:

$$\begin{cases} \dfrac{d\theta}{dt} = \omega \\ J_p \dfrac{d\omega}{dt} = P_{ref}/\omega_{ref} - P/\omega_{ref} + D_p(\omega_{ref} - \omega) \end{cases}$$

where ω represents an angular frequency, θ represents the phase angle, $D_p$ represents a damping coefficient of active power control, $J_p$ represents a moment of inertia of the active power control, $P_{ref}$ represents the active power reference value, $\omega_{ref}$ represents an angular frequency reference value, and P represents the outputted active power.

Preferably, the voltage regulation motion equation of the virtual synchronous machine is expressed as:

$$J_q \frac{dV}{dt} = Q_{ref} - Q + D_q(V_{mref} - V)$$

where $D_q$ represents a damping coefficient of reactive power control, $J_q$ represents a moment of inertia of the reactive power control, $Q_{ref}$ represents the reactive power reference value, Q represents the outputted reactive power, $V_{mref}$ represents a grid voltage amplitude reference value, and V represents the grid voltage amplitude.

Preferably, the determining the active power setting value as the active power reference value when it is detected that the frequency deviation of the alternating current grid is less than the preset frequency deviation threshold; and adding the deviation value of the active power that changes with the frequency of the alternating current grid to the active power setting value and determining the obtained sum as the active power reference value when it is detected that the frequency deviation of the alternating current grid is greater than the preset frequency deviation threshold is expresses as:

$$P_{ref}\begin{cases} P_{set}, & |f_{ref}-f| \le \Delta f_{set} \\ P_{set} + [K_P(f_{ref}-f) + \\ T_P\int (f_{ref}-f)\Big]\dfrac{\alpha_i(P_{max\,i}-P_i)}{\sum_i^n \alpha_i(P_{max\,i}-P_i)}, & f_{ref}-f > \Delta f_{set} \\ P_{set} + [K_P(f_{ref}-f) + \\ T_P\int (f_{ref}-f)\Big]\dfrac{\alpha_i P_i}{\sum_i^n \alpha_i P_i}, & f-f_{ref} > \Delta f_{set} \end{cases}$$

where $P_{ref}$ represents the active power reference value, $P_{set}$ represents the active power setting value, $f_{ref}$ represents a frequency reference value, f represents an actual frequency of the alternating current grid, $K_P$ represents a first frequency deviation control coefficient, $T_P$ represents a second frequency deviation control coefficient, $\Delta f_{set}$ represents a preset frequency deviation threshold, at represents an operating status of an $i^{th}$ flexible direct current electric power transmission system, $P_{maxi}$ represents a maximum of active power outputted by the $i^{th}$ flexible direct current electric power transmission system, $P_i$ represents an actual active power outputted by the $i^{th}$ flexible direct current electric power transmission system, and n is the number of flexible direct current electric power transmission systems participating in frequency regulation.

Preferably, the determining the reactive power setting value as the reactive power reference value when it is detected that the voltage deviation of the alternating current grid is less than the preset voltage deviation threshold; and adding the deviation value of the reactive power that changes with the voltage of the alternating current grid to the reactive power setting value and determining the obtained sum as the reactive power reference value when it is detected that the voltage deviation of the alternating current grid is greater than the preset voltage deviation threshold is expresses as:

$$Q_{ref} = \begin{cases} Q_{set}, & |V_{mref}-V_m| \le \Delta V_{set} \\ Q_{set} + [K_Q(V_{mref}-V_m) + \\ T_Q\int (V_{mref}-V_m)\Big]\dfrac{\alpha_i(Q_{max\,i}-Q_i)}{\sum_i^k \alpha_i(Q_{max\,i}-Q_i)}, & V_{mref}-V_m > \Delta V_{set} \\ Q_{set} + [K_Q(V_{mref}-V_m) + \\ T_Q\int (V_{mref}-V_m)\Big]\dfrac{\alpha_i(Q_{max\,i}+Q_i}{\sum_i^k \alpha_i(Q_{max\,i}+Q_i)}, & V_m-V_{mref} > \Delta V_{set} \end{cases}$$

where $Q_{ref}$ represents the reactive power reference value, $Q_{set}$ represents the active power setting value, $V_{mref}$ represents a grid voltage amplitude reference value, $V_m$ represents an actual grid voltage amplitude, $K_Q$ represents a first voltage deviation control coefficient, $T_Q$ represents a second voltage deviation control coefficient, $\Delta V_{set}$ represents the preset voltage deviation threshold, $\alpha_i$ represents an operating status of an $i^{th}$ flexible direct current electric power transmission system, $Q_{maxi}$ represents a maximum of reactive power outputted by the $i^{th}$ flexible direct current electric power transmission system, $Q_i$ represents an actual reactive power outputted by the $i^{th}$ flexible direct current electric power transmission system, and k is the number of flexible direct current electric power transmission systems participating in voltage regulation.

Preferably, the performing the PI control on the actual grid voltage based on the grid voltage amplitude and the phase angle, and acquiring the three-phase voltage reference value through inner-loop control includes: performing dq transformation on the grid voltage amplitude based on the phase angle to obtain a d-axis voltage reference value and a q-axis voltage reference value; performing the PI control on a d-axis component of the actual grid voltage based on the d-axis voltage reference value to obtain a d-axis current reference value, and performing the PI control on a q-axis component of the actual grid voltage based on the q-axis voltage reference value to obtain a q-axis current reference value; controlling a d-axis component of an actual alternating current to track the d-axis current reference value to obtain a d-axis reference component of a valve voltage, and controlling a q-axis component of the actual alternating current to track the q-axis current reference value to obtain a q-axis reference component of the valve voltage; and inversely transforming the d-axis reference component and the q-axis reference component of the valve voltage based on the phase angle, to obtain the three-phase voltage reference value.

The device for controlling the grid configuration of the flexible direct current electric power transmission system is also provided according to another aspect of the embodiments of the present disclosure to solve the same problem. The device includes: a power reference value setting module, a power control module, and a voltage-current control module. The power reference value setting module is configured to modify an active power reference value based on a frequency deviation of an alternating current grid, and modify a reactive power reference value based on a voltage deviation of the alternating current grid. The power control module is configured to: control an outputted active power by using a pre-established frequency regulation motion equation of a virtual synchronous machine based on the active power reference value and configure a phase angle; control an outputted reactive power by using a pre-established voltage regulation motion equation of the virtual synchronous machine based on the reactive power reference value and configure a grid voltage amplitude. The voltage-current control module is configured to perform PI control on an actual grid voltage based on the grid voltage amplitude and the phase angle and acquire a three-phase voltage reference value through inner-loop control.

A computer-readable storage medium is also provided according to an embodiment of the present disclosure. The computer-readable storage medium includes a stored computer program. When the computer program is running, a device where the computer-readable storage medium is located performs the above method.

Compared with the existing technology, with the method for controlling the grid configuration of the flexible direct current electric power transmission system according to embodiments of the present disclosure, the active power reference value is modified based on the frequency deviation of the alternating current grid. The reactive power reference value is modified based on the voltage deviation of the alternating current grid. Control of a virtual synchronous generator is simulated. The outputted active power and the outputted reactive power are controlled based on the active power reference value and the reactive power reference value, respectively. The grid voltage is further configured and controlled through power control, so that the flexible direct current electric power transmission system is capable of self-synchronization, frequency regulation and voltage regulation. In addition, the virtual synchronous machine technology is introduced into control of the reactive power according to embodiments of the present disclosure, so that the flexible direct current electric power transmission system can provide inertia support for the grid voltage amplitude, thereby enhancing anti-interference of the grid voltage amplitude. A device for controlling the grid configuration of the flexible direct current electric power transmission system, and a computer-readable storage medium are also provided according to embodiments of the present disclosure.

DETAILED DESCRIPTION OF THE EMBODIMENTS

The technical solutions in the embodiments of the present disclosure are clearly and completely described below with reference to the drawings in the embodiments of the present disclosure. Only some instead of all the embodiments of the present disclosure are described herein. Based on the embodiments in this specification, all other embodiments obtained by those skilled in the art without making creative efforts fall within the scope of protection of the present disclosure.

Figure 1:
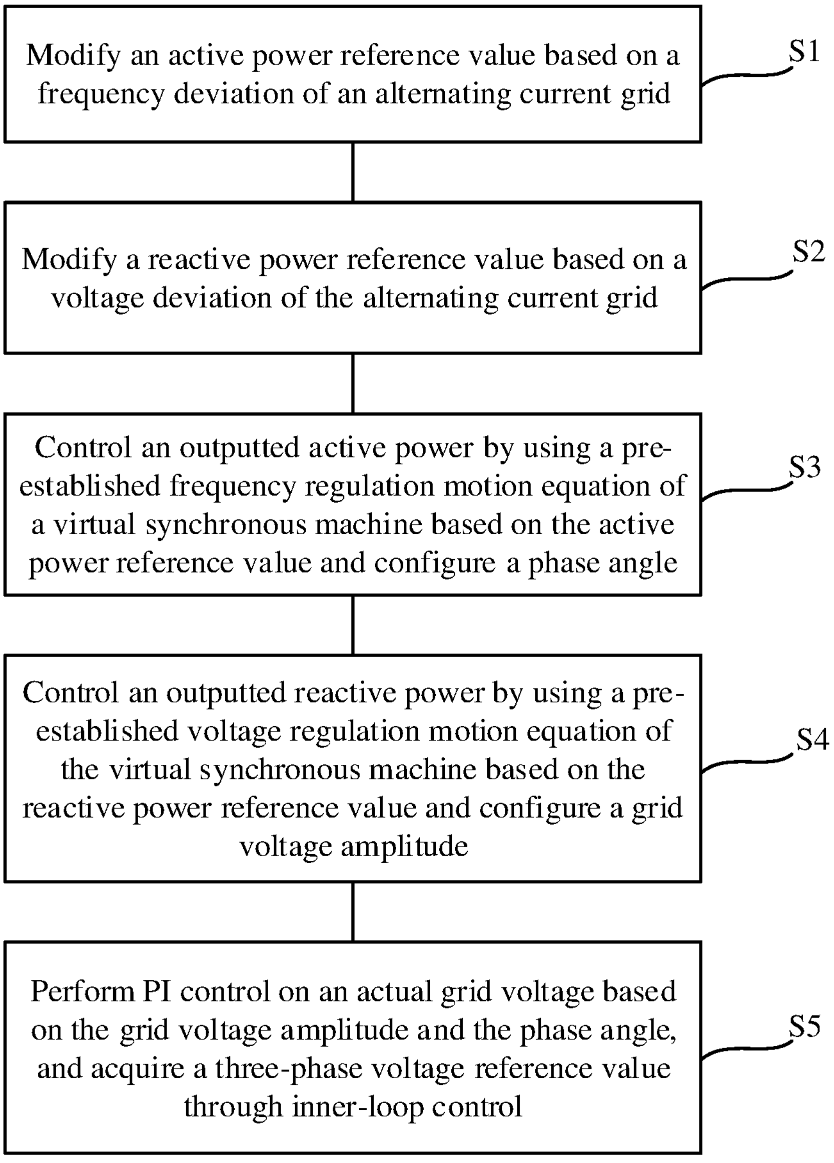
FIG. 1 is a schematic flowchart illustrating a method for controlling grid configuration of a flexible direct current electric power transmission system according to an embodiment of the present disclosure.

Reference is made to FIG. 1, which is a schematic flowchart illustrating a method for controlling grid configuration of a flexible direct current electric power transmission system according to an embodiment of the present disclosure.

The method for controlling the grid configuration of the flexible direct current electric power transmission system according to the embodiment of the present disclosure includes the following steps S1 to S5.

In step S1, an active power reference value is modified based on a frequency deviation of an alternating current grid.

In step S2, a reactive power reference value is modified based on a voltage deviation of the alternating current grid.

In step S3, an outputted active power is controlled by using a pre-established frequency regulation motion equation of a virtual synchronous machine based on the active power reference value, and a phase angle is configured.

In step S4, an outputted reactive power is controlled by using a pre-established voltage regulation motion equation of the virtual synchronous machine based on the reactive power reference value, and a grid voltage amplitude is configured.

In step S5, PI control is performed on an actual grid voltage based on the grid voltage amplitude and the phase angle, and a three-phase voltage reference value is acquired through inner-loop control.

It should be noted that in practice, step S1 and step S2 may be performed simultaneously, that is, step S1 and step S2 in the embodiments of the present disclosure are considered to be a procedure for setting the power reference value. Step S3 and step S4 may also be performed simultaneously, that is, step S3 and step S4 in the embodiments of the present disclosure are considered to be a procedure of power control. In addition, the steps S1 to S5 should not be understood as limiting the order of steps of the control method of the embodiments of the present disclosure, and may be performed differently in actual applications.

With the method for controlling the grid configuration of the flexible direct current electric power transmission system according to embodiments of the present disclosure, the active power reference value is modified based on the frequency deviation of the alternating current grid. The reactive power reference value is modified based on the voltage deviation of the alternating current grid. Control of a virtual synchronous generator is simulated. The outputted active power and the outputted reactive power are controlled based on the active power reference value and the reactive power reference value, respectively. The grid voltage is further configured and controlled through power control, so that the flexible direct current electric power transmission system is capable of self-synchronization, frequency regulation and voltage regulation. In addition, the virtual synchronous machine technology is introduced into control of the reactive power according to embodiments of the present disclosure, so that the flexible direct current electric power transmission system can provide inertia support for the grid voltage amplitude, thereby enhancing anti-interference of the grid voltage amplitude.

It should be understood that when the frequency of the alternating current grid deviates, the flexible direct current electric power transmission system participates in frequency regulation by active power-frequency control, and therefore operates in a new equilibrium point to achieve a rapid frequency regulation effect similar to primary frequency regulation. Since primary frequency regulation is differential regulation, the frequency of the alternating current grid generally fails to return to the initial state. In order to bring the frequency of the alternating current grid closer to the initial state, it is necessary to further modify the frequency of the alternating current grid. Therefore, in one embodiment, the step S1 of "modifying the active power reference value based on the frequency deviation of the alternating current grid" is detailed as follows. When it is detected that the frequency deviation of the alternating current grid is less than a preset frequency deviation threshold, an active power setting value is determined as the active power reference value. When it is detected that the frequency deviation of the alternating current grid is greater than the preset frequency deviation threshold, the deviation value of the active power that changes with the frequency of the alternating current grid is added to the active power setting value, as the active power reference value.

Specifically, when the frequency of the alternating current grid deviates, the active power reference value is modified by formula (1) to further achieve fine regulation of the frequency.

$$P_{ref}=\begin{cases} P_{set}, & |f_{ref}-f|\le \Delta f_{set} \\ P_{set}+[K_P(f_{ref}-f)+ \\ T_P(f_{ref}-f)]\dfrac{\alpha_i(P_{max\,i}-P_i)}{\sum_i^n \alpha_i(P_{max\,i}-P_i)}, & f_{ref}-f>\Delta f_{set} \\ P_{set}+[K_p(f_{ref}-f)+ \\ T_P\int(f_{ref}-f)\Big]\dfrac{\alpha_i P_i}{\sum_i^n \alpha_i P_i}, & f-f_{ref}>\Delta f_{set} \end{cases} \tag{1}$$

$P_{ref}$ is the active power reference value. $P_{set}$ is the active power setting value. $f_{ref}$ is the frequency reference value. f is the actual frequency of the alternating current grid. $K_P$ is the first frequency deviation control coefficient. $T_P$ is the second frequency deviation control coefficient. $\Delta f_{set}$ is the preset frequency deviation threshold. $\alpha_i$ is the operating status of the $i^{th}$ flexible direct current electric power transmission system. $P_{maxi}$ is the maximum value of active power outputted by the $i^{th}$ flexible direct current electric power transmission system. $P_i$ is the actual active power outputted by the $i^{th}$ flexible direct current electric power transmission system. n is the number of flexible direct current electric power transmission systems participating in frequency regulation. $K_P$ and $T_P$ are set according to the required control effect. $\Delta f_{set}$ is set according to the requirements of the alternating current grid.

When the $i^{th}$ flexible direct current electric power transmission system is in operation, at is equal to 1. When the $i^{th}$ flexible direct current electric power transmission system is not in operation, $\alpha_i$ is not equal to 1.

In the embodiments of the present disclosure, it is considered that multiple flexible direct current electric power transmission systems are connected to the same alternating current grid and jointly participate in frequency regulation. The active power is distributed according to the frequency regulation capabilities of the flexible direct current electric power transmission systems, which can give full play to the frequency regulation capability of each flexible Direct current electric power transmission system, thereby achieving a more precise frequency regulation effect. In addition, in the embodiments of the present disclosure, the linear term and the integral term of the frequency deviation are introduced to calculate the total power deviation value. Then the power is distributed according to the frequency regulation capabilities of the flexible direct current electric power transmission systems, which can improve the accuracy of secondary frequency regulation, thereby enhancing the frequency stability of the system. In the embodiments of the present disclosure, when calculating the deviation value of the active power based on the frequency deviation of the power grid, the integral term $T_p\int(f_{ref}-f)$ of the frequency deviation is introduced to improve the accuracy of secondary frequency regulation. If the deviation value of the active power is calculated only based on the linear term $K_p(f_{ref}-f)$ of the frequency deviation, $K_P$ is set according to the grid characteristics. When the power grid strength changes, the secondary frequency regulation may have errors. With the integral term of the frequency deviation, the accuracy of the secondary frequency regulation can be maintained even when the grid characteristics changes in the embodiments of the present disclosure.

Further, when the voltage of the alternating current grid deviates, the flexible direct current electric power transmission system participates in voltage regulation by active power-voltage control, and therefore is capable of voltage regulation. However, the existing voltage regulation is generally differential regulation, and the voltage of the alternating current grid generally fails to return to the initial state. In order to bring the voltage of the alternating current grid closer to the initial state, the voltage of the alternating current grid is further modified. Therefore, in one embodiment, the step S2 of "modifying the reactive power reference value based on the voltage deviation of the alternating current grid" is detailed as follows. When it is detected that the voltage deviation of the alternating current grid is less than a preset voltage deviation threshold, a reactive power setting value is determined as the reactive power reference value. When it is detected that the voltage deviation of the alternating current grid is greater than the preset voltage deviation threshold, the deviation value of the reactive power that changes with the voltage of the alternating current grid is added to the reactive power setting value, as the reactive power reference value.

Specifically, when the voltage of the alternating current grid deviates, the reactive power reference value is modified by formula (2) to further achieve fine regulation of the voltage.

$$Q_{ref}=\begin{cases} Q_{set}, & |V_{mref}-V_m|\le \Delta V_{set} \\ Q_{set}+[K_Q(V_{mref}-V_m)+ \\ T_Q\int(V_{mref}-V_m)\Big]\dfrac{\alpha_i(Q_{max\,i}-Q_i)}{\sum_i^k \alpha_i(Q_{max\,i}-Q_i)}, & V_{mref}-V_m>\Delta V_{set} \\ Q_{set}+[K_Q(V_{mref}-V_m)+ \\ T_Q\int(V_{mref}-V_m)\Big]\dfrac{\alpha_i(Q_{max\,i}+Q_i)}{\sum_i^k \alpha_i(Q_{max\,i}+Q_i)}, & V_m-V_{mref}>\Delta V_{set} \end{cases} \tag{2}$$

$Q_{ref}$ is the reactive power reference value. $Q_{set}$ is the active power setting value. $V_{mref}$ is the grid voltage amplitude reference value. $V_m$ is the actual grid voltage amplitude. $K_Q$ is the first voltage deviation control coefficient. $T_Q$ is the second voltage deviation control coefficient. $\Delta V_{set}$ is the preset voltage deviation threshold. $\alpha_i$ is the operating status of the $i^{th}$ flexible direct current electric power transmission system. $Q_{maxi}$ is the maximum value of reactive power outputted by the $i^{th}$ flexible direct current electric power transmission system. $Q_i$ is the actual reactive power outputted by the $i^{th}$ flexible direct current electric power transmission system. k is the number of flexible direct current electric power transmission systems participating in voltage regulation. Both $K_Q$ and $\Delta_{fset}$ are set according to the characteristics of the alternating current grid.

Similar to the regulation of the active power reference value, the integral term $T_Q\int(V_{mref}-V)$ of the voltage deviation is introduced when modifying the reactive power reference value in the embodiments of the present disclosure, so that precise voltage regulation can be achieved even when the grid characteristics change.

In the embodiments of the present disclosure, through the regulation of the active power in step S1 and the regulation of the reactive power in step S2, the flexible direct current electric power transmission system can finely modify the frequency and amplitude of the grid voltage. Therefore, the frequency and voltage amplitude of the alternating current grid are closer to the initial state.

In one embodiment, the frequency regulation motion equation of the virtual synchronous machine is as follows.

$$\begin{cases} \frac{d\theta}{dt} = \omega \\ J_p \frac{d\omega}{dt} = P_{ref}/\omega_{ref} - P/\omega_{ref} + D_p(\omega_{ref} - \omega) \end{cases} \tag{3}$$

$\omega$ is the angular frequency. $\theta$ is the phase angle. $D_P$ is the damping coefficient of active power control. $J_P$ is the moment of inertia of active power control. $P_{ref}$ is the active power reference value. $\omega_{ref}$ is the angular frequency reference value. P is the outputted active power, that is, the actual active power.

In one embodiment, the voltage regulation motion equation of the virtual synchronous machine is as follows.

$$J_q \frac{dV}{dt} = Q_{ref} - Q + D_q(V_{mref} - V) \tag{4}$$

$D_q$ is the damping coefficient of reactive power control. $J_q$ is the moment of inertia of reactive power control. $Q_{ref}$ is the reactive power reference value. Q is the outputted reactive power, that is, the actual reactive power. $V_{mref}$ is the grid voltage amplitude reference value. V is the grid voltage amplitude.

Figure 2:
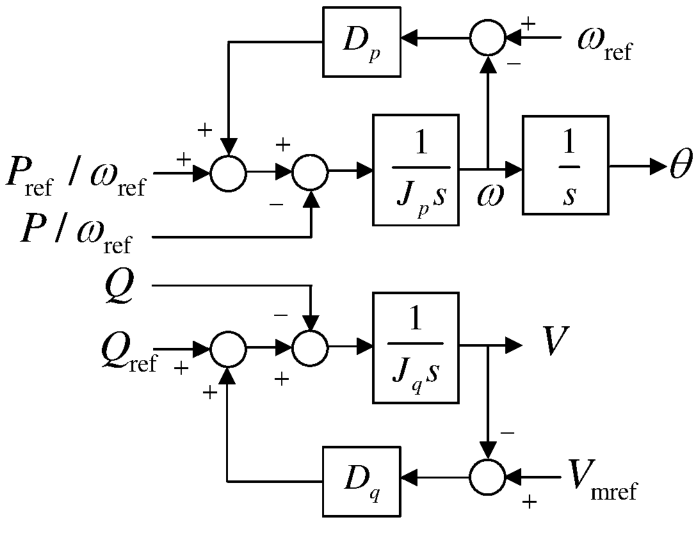
FIG. 2 is a block diagram illustrating power control in the method for controlling the grid configuration of the flexible direct current electric power transmission system according to an embodiment of the present disclosure.

Reference is made to FIG. 2, which is a block diagram illustrating power control in the method for controlling the grid configuration of the flexible direct current electric power transmission system according to an embodiment of the present disclosure. 1/s represents the integral. $J_p$ and $J_q$ are moments of inertia, for simulating the inertia of the synchronous generator. $D_p$ and $D_q$ are damping coefficients, for simulating the damping characteristics of the synchronous generator. It can be seen from FIG. 2, formula (3) and formula (4) that, the control of the reactive power is symmetrically configured with reference to the control of active power, and the moment of inertia J and the damping coefficient D are also introduced into the control of reactive power in the embodiments of the present disclosure. In addition, the voltage regulation of the flexible direct current electric power transmission system is also symmetrically configured with reference to the frequency regulation, so that the voltage regulation has two parts, namely, rapid differential regulation and fine non-differential regulation.

It can be understood that the active power and reactive power are controlled in the embodiment of the present disclosure so that the direct current electric power transmission system is capable of primary frequency regulation and voltage regulation. The principle is as follows. It is assumed that the flexible direct current electric power transmission system is connected to an ideal voltage source. In this case, the grid frequency of the flexible direct current electric power transmission system depends on the ideal voltage source. When the frequency of the voltage source is equal to the frequency reference value $fr_{ef}$, the active power P outputted by the flexible direct current electric power transmission system after stable operation is equal to $P_{ref}$, and non-differential control of the active power is achieved. When the frequency of the voltage source is greater than the frequency reference value $f_{ref}$, the active power P outputted by the flexible direct current electric power transmission system after stable operation is less than $P_{ref}$. When the frequency of the voltage source is less than the frequency reference value $f_{ref}$, the active power P outputted by the flexible direct current electric power transmission system after stable operation is greater than $P_{ref}$. It can be seen that when the frequency of the voltage source deviates from the frequency reference value $f_{ref}$, the flexible direct current electric power transmission system can automatically respond and regulate the outputted active power through the control of formula (3), so that the system always remains at a frequency matching the frequency of the voltage source, thereby achieving self-synchronization. When the flexible direct current electric power transmission system is connected to the actual alternating current grid, the frequency of the alternating current grid may be affected by the power delivered by the flexible direct current electric power transmission system. It can be seen from the above analysis that when the frequency of the alternating current grid is less than the frequency reference value $f_{ref}$, the active power P outputted by the direct current electric power transmission system is greater than $P_{ref}$, and the flexible direct current electric power transmission system transmits more active power and therefore increase the frequency of the alternating current grid. On the contrary, when the frequency of the alternating current grid is greater than the frequency reference value $f_{ref}$, the flexible direct current electric power transmission system transmits less active power and therefore reduces the frequency of the alternating current grid. It can be seen that when the frequency of the alternating current grid deviates from the frequency reference value $f_{ref}$, the differential regulation of the active power of the flexible direct current electric power transmission system can avoid the frequency deviation of the grid, thereby achieving primary frequency regulation characteristics similar to that of a synchronous generator. The control of reactive power is similar to that of active power. When the grid voltage amplitude is equal to the voltage reference value $V_{mref}$, the reactive power Q outputted by the flexible direct current electric power transmission system is equal to $Q_{ref}$. When the grid voltage amplitude is less than the voltage reference value $V_{mref}$, the reactive power Q outputted by the flexible direct current electric power transmission system is greater than $Q_{ref}$ to increase the grid voltage. When the grid voltage amplitude is greater than the voltage reference value $V_{mref}$, the reactive power Q outputted by the flexible direct current electric power transmission system is less than $Q_{ref}$ to reduce the grid voltage. It can be seen that the flexible direct current electric power transmission system is capable of voltage regulation similar to that of a synchronous generator through the control logic in formula (4).

In one embodiment, the performing PI control on the actual grid voltage based on the grid voltage amplitude and the phase angle and acquiring the three-phase voltage reference value in the inner-loop current control manner includes: performing dq transformation on the grid voltage amplitude based on the phase angle to obtain a d-axis voltage reference value and a q-axis voltage reference value; performing PI control on the d-axis component of the actual grid voltage based on the d-axis voltage reference value to obtain the d-axis current reference value, and performing PI control on the q-axis component of the actual grid voltage based on on the q-axis voltage reference value to obtain the q-axis current reference value; controlling the d-axis component of the actual alternating current to track the d-axis current reference value to obtain the d-axis reference component of a valve voltage, and controlling the q-axis component of the actual alternating current to track the q-axis current reference value to obtain the q-axis reference component of the valve voltage; and inversely transforming the d-axis reference component and the q-axis reference component of the valve voltage based on the phase angle, to obtain the three-phase voltage reference value.

Figure 3:
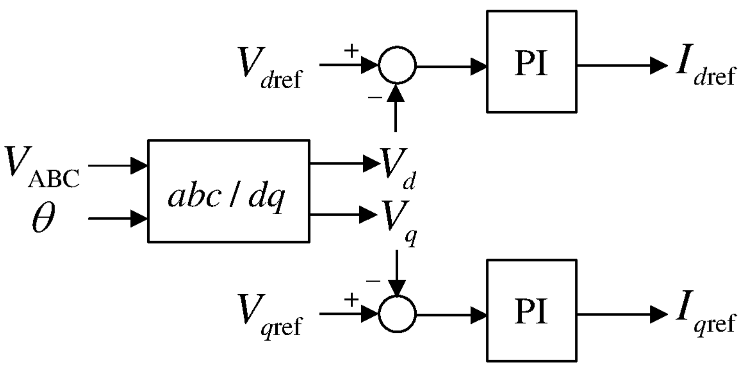
FIG. 3 is a block diagram illustrating voltage control in the method for controlling the grid configuration of the flexible direct current electric power transmission system according to an embodiment of the present disclosure.
Figure 4:
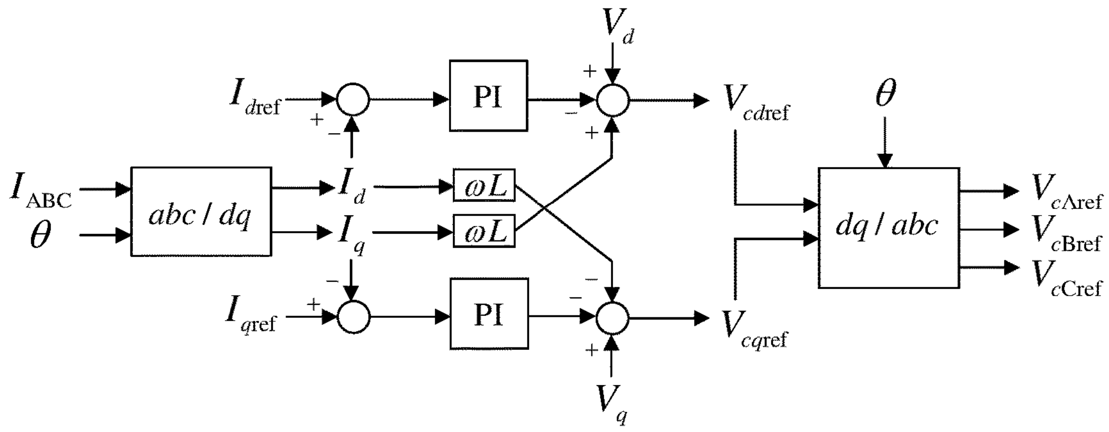
FIG. 4 is a block diagram illustrating current control in the method for controlling the grid configuration of the flexible direct current electric power transmission system according to an embodiment of the present disclosure.

Reference is made to FIGS. 3 and 4. FIG. 3 is a block diagram illustrating voltage control in the method for controlling the grid configuration of the flexible direct current electric power transmission system according to an embodiment of the present disclosure. FIG. 4 is a block diagram illustrating current control in the method for controlling the grid configuration of the flexible direct current electric power transmission system according to an embodiment of the present disclosure. In the embodiments of the present disclosure, after controlling the active power and reactive power, the three-phase voltage reference value can be obtained through voltage control and current control. Referring to FIG. 3, in the voltage control, the d-axis voltage reference value $V_{dref}$ and the q-axis voltage reference value $V_{qref}$ in the dq rotating coordinate system are obtained based on the grid voltage amplitude V and phase angle θ configured in the power control. Then, PI control is performed on the d-axis component $V_d$ and q-axis component $V_q$ of the actual grid voltage to output the d-axis current reference value $I_{dref}$ and q-axis current reference value $I_{qref}$ on the grid side. During normal operation of the flexible direct current electric power transmission system, dq transformation is performed based on the phase angle θ outputted in the power control, and therefore no additional phase-locked loop is involved in the control. Referring to the current control as shown in FIG. 4, it can be understood that the current control in the embodiments of the present disclosure is the same as the inner loop current control in vector control. The current control aims to control the d-axis component Id of the actual alternating current to track the d-axis current reference value $I_{dref}$, and the q-axis component $I_q$ of the actual alternating current to track the q-axis current reference value $I_{qref}$. The output is the d-axis reference component $V_{cdref}$ and q-axis component $V_{cqref}$ of the valve voltage. The d-axis component $V_{cdref}$ and q-axis component $V_{cqref}$ of the valve voltage are inversely dq transformed based on the phase angle θ to obtain the three-phase voltage reference values $V_{cAref}$, $V_{cBref}$ and $V_{cCref}$. There is also no phase-locked loop involved in this control.

Figure 5:
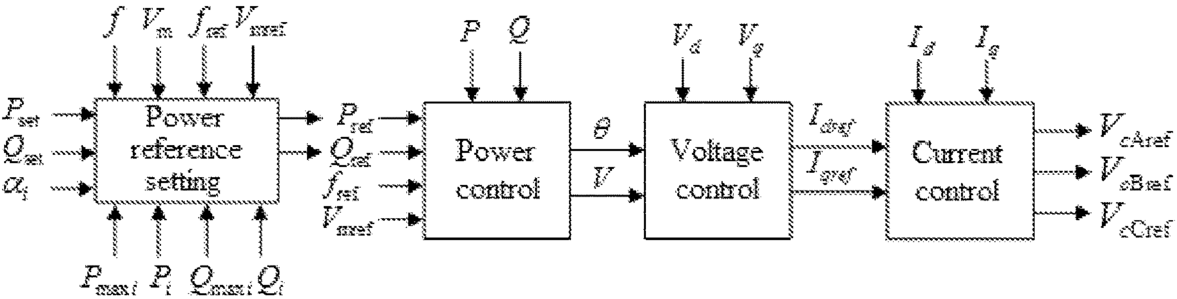
FIG. 5 is a block diagram illustrating control of the grid configuration of the flexible direct current electric power transmission system according to an embodiment of the present disclosure.

FIG. 5 is a block diagram illustrating control of the grid configuration of the flexible direct current electric power transmission system according to an embodiment of the present disclosure. It can be seen from the above analysis that the control method of the direct current electric power transmission system according to the embodiments of the present disclosure involves power reference value setting, power control, voltage control and current control. In the power reference value setting, the reference values of active power and reactive power are regulated according to the changes in grid voltage frequency and amplitude respectively, so that the flexible direct current electric power transmission system can finely regulate the grid voltage frequency and amplitude. In the power control, the motion equation of the synchronous generator is simulated, and the amplitude and phase angle of the grid voltage are configured through the power control, so that the flexible direct current electric power transmission system is capable of self-synchronization, rapid frequency regulation and voltage regulation. No phase locked loop is involved in normal operation. In the voltage control, the actual grid voltage is controlled according to the expected grid voltage amplitude and phase angle to obtain the current reference value. In the current control, the actual grid current is controlled according to the current reference value to obtain the three-phase voltage reference value. With the control method according to the embodiments of the present disclosure, the flexible direct current electric power transmission system can exhibit the characteristics of a voltage source. In addition, virtual inertia is introduced into the voltage regulation in the control method according to the embodiments of the present disclosure, so that the flexible direct current electric power transmission system can provide inertia support for the grid voltage amplitude. In the transient process, the greater the inertia, the smaller the sudden change in voltage caused by the same disturbance, thereby enhancing the anti-interference ability of the grid voltage amplitude.

Figure 6:
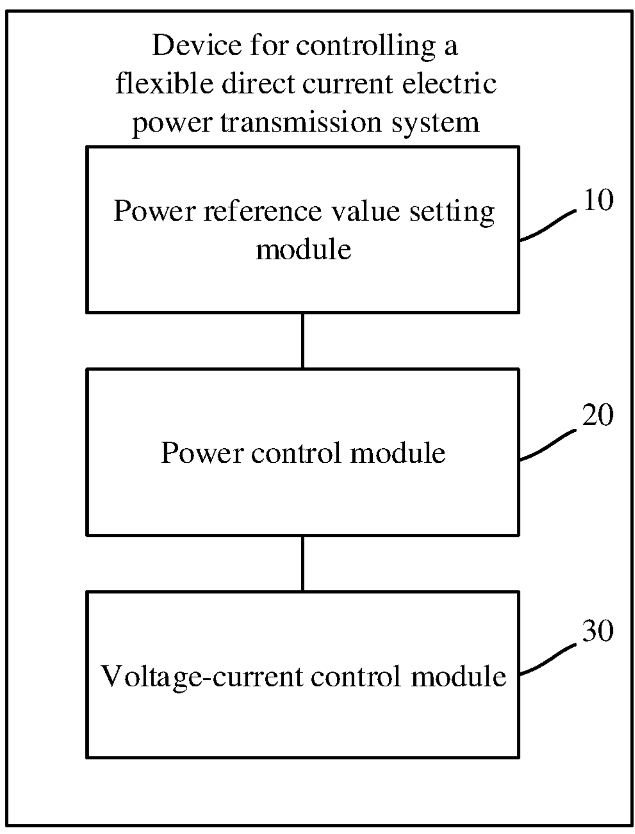
FIG. 6 is a structural block diagram illustrating the device for controlling the grid configuration of the flexible direct current electric power transmission system according to an embodiment of the present disclosure.

Correspondingly, FIG. 6 is a structural block diagram illustrating the device for controlling the grid configuration of the flexible direct current electric power transmission system according to an embodiment of the present disclosure. The device includes: a power reference value setting module 10, a power control module 20, and a voltage-current control module 30.

The power reference value setting module 10 is configured to modify an active power reference value based on a frequency deviation of an alternating current grid, and modify a reactive power reference value based on a voltage deviation of the alternating current grid.

The power control module 20 is configured to: establish a frequency regulation motion equation of a virtual synchronous machine, control an outputted active power by using the frequency regulation motion equation based on the active power reference value, and configure a phase angle; and establish a voltage regulation motion equation of the virtual synchronous machine, control an outputted reactive power by using the voltage regulation motion equation based on the reactive power reference value, and configure a grid voltage amplitude.

The voltage-current control module 30 is configured to perform PI control on an actual grid voltage based on the grid voltage amplitude and the phase angle and acquire a three-phase voltage reference value through inner-loop control.

It should be understood that the implementation, principle and function of the control device according to the embodiments of the present disclosure are the same as the control method, and thus are not detailed here.

It should be noted that the device embodiments described above are only illustrative. Units described as separate components may or may not be physically separate. A component shown as a unit may or may not be a physical unit, that is, may be located in one place, or may be distributed over multiple network units. Some or all of the modules may be selected according to actual needs in order to implement the solutions in the embodiments. In addition, in the drawings of the device embodiments provided herein, the connection between modules indicates that there is communication connection between the modules, which can be implemented as one or more communication buses or signal lines. Those skilled in the art can understand and implement the method after reading the specification.

A computer-readable storage medium is also provided according to an embodiment of the present disclosure. The computer-readable storage medium includes a stored computer program. When the computer program is running, a device where the computer-readable storage medium is located performs the above steps S1 to S5.

The computer-readable storage medium may be a magnetic disk, an optical disk, a read-only memory (ROM) or a random-access memory (RAM), etc.

In summary, the method and the device for controlling grid configuration of the flexible direct current electric power transmission system as well as the computer-readable storage medium according to the embodiments of the present disclosure have the following beneficial effects.

(1) In the embodiments of the present disclosure, the active power reference value is modified based on the frequency deviation of the alternating current grid. The reactive power reference value is modified based on the voltage deviation of the alternating current grid. Control of a virtual synchronous generator is simulated. The outputted active power and the outputted reactive power are controlled based on the active power reference value and the reactive power reference value, respectively. The grid voltage is further configured and controlled through power control, so that the flexible direct current electric power transmission system is capable of self-synchronization, frequency regulation and voltage regulation.

(2) In the embodiments of the present disclosure, the control of the reactive power is symmetrically configured with reference to the control of the active power, and the moment of inertia J and the damping coefficient D are also introduced into the control of the reactive power, so that the voltage regulation has two parts, namely, rapid differential regulation and fine non-differential regulation.

(3) In the embodiments of the present disclosure, it is considered that multiple flexible direct current electric power transmission systems are connected to the same alternating current grid and jointly participate in frequency regulation when modifying the active power reference value and the reactive power reference value. Moreover, when the frequency of the alternating current grid changes, the linear term and the integral term of the frequency deviation are introduced to calculate the total power deviation. Then the power is distributed according to the frequency regulation capabilities of the flexible direct current electric power transmission systems, thereby improving the accuracy of secondary frequency regulation and voltage regulation.

Preferred embodiments of the present disclosure are as described above. It should be noted that several improvements and modifications can be made by those skilled in the art without departing from the principles of this specification. These improvements and modifications are also considered to be within the scope of the present disclosure.

The invention claimed is:

1. A method for controlling grid configuration of a flexible direct current electric power transmission system, comprising:

modifying an active power reference value based on a frequency deviation of an alternating current grid;

modifying a reactive power reference value based on a voltage deviation of the alternating current grid;

controlling an outputted active power by using a pre-established frequency regulation motion equation of a virtual synchronous machine based on the active power reference value and configuring a phase angle;

controlling an outputted reactive power by using a pre-established voltage regulation motion equation of the virtual synchronous machine based on the reactive power reference value and configuring a grid voltage amplitude; and performing PI control on an actual grid voltage based on the grid voltage amplitude and the phase angle, and acquiring a three-phase voltage reference value through inner-loop control;

wherein the modifying the active power reference value based on the frequency deviation of the alternating current grid comprises:

determining an active power setting value as the active power reference value when it is detected that the frequency deviation of the alternating current grid is less than a preset frequency deviation threshold; and adding a deviation value of active power that changes with a frequency of the alternating current grid to the active power setting value and determining the obtained sum as the active power reference value when it is detected that the frequency deviation of the alternating current grid is greater than the preset frequency deviation threshold.

2. The method according to claim 1, wherein the modifying the reactive power reference value based on the voltage deviation of the alternating current grid comprises:

determining a reactive power setting value as the reactive power reference value when it is detected that the voltage deviation of the alternating current grid is less than a preset voltage deviation threshold; and adding a deviation value of reactive power that changes with a voltage of the alternating current grid to the reactive power setting value and determining the obtained sum as the reactive power reference value when it is detected that the voltage deviation of the alternating current grid is greater than the preset voltage deviation threshold.

3. The method according to claim 1, wherein the frequency regulation motion equation of the virtual synchronous machine is expressed as:

$$\begin{cases} \frac{d\theta}{dt} = \omega \\ J_p \frac{d\omega}{dt} = P_{ref}/\omega_{ref} - P/\omega_{ref} + D_p(\omega_{ref} - \omega) \end{cases}$$

wherein ω represents an angular frequency, θ represents the phase angle, $D_p$ represents a damping coefficient of active power control, $J_p$ represents a moment of inertia of the active power control, $P_{ref}$ represents the active power reference value, $\omega_{ref}$ represents an angular frequency reference value, and P represents the outputted active power.

4. The method according to claim 1, wherein the voltage regulation motion equation of the virtual synchronous machine is expressed as:

$$J_q \frac{dV}{dt} = Q_{ref} - Q + D_q(V_{mref} - V)$$

wherein $D_q$ represents a damping coefficient of reactive power control, $J_q$ represents a moment of inertia of the reactive power control, $Q_{ref}$ represents the reactive power reference value, Q represents the outputted reactive power, $V_{mref}$ represents a grid voltage amplitude reference value, and V represents the grid voltage amplitude.

5. The method according to claim 1, wherein the determining the active power setting value as the active power reference value when it is detected that the frequency deviation of the alternating current grid is less than the preset frequency deviation threshold; and adding the deviation value of the active power that changes with the frequency of the alternating current grid to the active power setting value and determining the obtained sum as the active power reference value when it is detected that the frequency deviation of the alternating current grid is greater than the preset frequency deviation threshold is expresses as:

$$P_{ref}=\begin{cases} P_{set}, & |f_{ref}-f|\le\Delta f_{set} \\ P_{set}+[K_P(f_{ref}-f)+ \\ T_P(f_{ref}-f)]\dfrac{\alpha_i(P_{max\,i}-P_i)}{\sum_i^n \alpha_i(P_{max\,i}-P_i)}, & f_{ref}-f>\Delta f_{set} \\ P_{set}+[K_p(f_{ref}-f)+ \\ T_P\int(f_{ref}-f)\Big]\dfrac{\alpha_i P_i}{\sum_i^n \alpha_i P_i}, & f-f_{ref}>\Delta f_{set} \end{cases}$$

wherein $P_{ref}$ represents the active power reference value, $P_{set}$ represents the active power setting value, $f_{ref}$ represents a frequency reference value, f represents an actual frequency of the alternating current grid, $K_P$ represents a first frequency deviation control coefficient, $T_P$ represents a second frequency deviation control coefficient, $\Delta f_{set}$ represents a preset frequency deviation threshold, $\alpha_i$ represents an operating status of an $i^{th}$ flexible direct current electric power transmission system, $P_{maxi}$ represents a maximum of active power outputted by the $i^{th}$ flexible direct current electric power transmission system, $P_i$ represents an actual active power outputted by the $i^{th}$ flexible direct current electric power transmission system, and n is the number of flexible direct current electric power transmission systems participating in frequency regulation.

6. The method according to claim 2, wherein the determining the reactive power setting value as the reactive power reference value when it is detected that the voltage deviation of the alternating current grid is less than the preset voltage deviation threshold; and adding the deviation value of the reactive power that changes with the voltage of the alternating current grid to the reactive power setting value and determining the obtained sum as the reactive power reference value when it is detected that the voltage deviation of the alternating current grid is greater than the preset voltage deviation threshold is expresses as:

$$Q_{ref}=\begin{cases} Q_{set}, & |V_{mref}-V_m|\le\Delta V_{set} \\ Q_{set}+[K_Q(V_{mref}-V_m)+ \\ T_Q\int(V_{mref}-V_m)\Big]\dfrac{\alpha_i(Q_{max\,i}-Q_i)}{\sum_i^k \alpha_i(Q_{max\,i}-Q_i)}, & V_{mref}-V_m>\Delta V_{set} \\ Q_{set}+[K_Q(V_{mref}-V_m)+ \\ T_Q\int(V_{mref}-V_m)\Big]\dfrac{\alpha_i(Q_{max\,i}+Q_i)}{\sum_i^k \alpha_i(Q_{max\,i}+Q_i)}, & V_m-V_{mref}>\Delta V_{set} \end{cases}$$

wherein $Q_{ref}$ represents the reactive power reference value, $Q_{set}$ represents the active power setting value, $V_{mref}$ represents a grid voltage amplitude reference value, $V_m$ represents an actual grid voltage amplitude, $K_Q$ represents a first voltage deviation control coefficient, $T_Q$ represents a second voltage deviation control coefficient, $\Delta V_{set}$ represents the preset voltage deviation threshold, ai represents an operating status of an $i^{th}$ flexible direct current electric power transmission system, $Q_{maxi}$ represents a maximum of reactive power outputted by the $i^{th}$ flexible direct current electric power transmission system, $Q_i$ represents an actual reactive power outputted by the $i^{th}$ flexible direct current electric power transmission system, and k is the number of flexible direct current electric power transmission systems participating in voltage regulation.

7. The method according to claim 1, wherein the performing the PI control on the actual grid voltage based on the grid voltage amplitude and the phase angle, and acquiring the three-phase voltage reference value through inner-loop control comprises:

performing dq transformation on the grid voltage amplitude based on the phase angle to obtain a d-axis voltage reference value and a q-axis voltage reference value;

performing the PI control on a d-axis component of the actual grid voltage based on the d-axis voltage reference value to obtain a d-axis current reference value, and performing the PI control on a q-axis component of the actual grid voltage based on the q-axis voltage reference value to obtain a q-axis current reference value;

controlling a d-axis component of an actual alternating current to track the d-axis current reference value to obtain a d-axis reference component of a valve voltage, and controlling a q-axis component of the actual alternating current to track the q-axis current reference value to obtain a q-axis reference component of the valve voltage; and inversely transforming the d-axis reference component and the q-axis reference component of the valve voltage based on the phase angle, to obtain the three-phase voltage reference value.

8. A non-transitory computer-readable storage medium storing a computer program that, when running, controls a device where the non-transitory computer-readable storage medium is located to perform the method according to claim 1.

9. A device for controlling grid configuration of a flexible direct current electric power transmission system, comprising:

a power reference value setting module configured to modify an active power reference value based on a frequency deviation of an alternating current grid, and modify a reactive power reference value based on a voltage deviation of the alternating current grid;

a power control module configured to: control an outputted active power by using a pre-established frequency regulation motion equation of a virtual synchronous machine based on the active power reference value and configure a phase angle; and control an outputted reactive power by using a pre-established voltage regulation motion equation of the virtual synchronous machine based on the reactive power reference value and configure a grid voltage amplitude; and a voltage-current control module configured to perform PI control on an actual grid voltage based on the grid voltage amplitude and the phase angle and acquire a three-phase voltage reference value through inner-loop control;

wherein the power reference value setting module is further configured to modify the active power reference value based on the frequency deviation of the alternating current grid by:

determining an active power setting value as the active power reference value when it is detected that the frequency deviation of the alternating current grid is less than a preset frequency deviation threshold; and adding a deviation value of active power that changes with a frequency of the alternating current grid to the active power setting value and determining the obtained sum as the active power reference value when it is detected that the frequency deviation of the alternating current grid is greater than the preset frequency deviation threshold.

* * * * *